(12) United States Patent
Yu et al.

(10) Patent No.: US 9,884,513 B2
(45) Date of Patent: Feb. 6, 2018

(54) UNIVERSAL ROTATING MODULE

(71) Applicant: ASUSTeK COMPUTER INC., Taipei (TW)

(72) Inventors: Li-Wei Yu, Taipei (TW); Chang-Ru Hsieh, Taipei (TW); Chang-Hung Chen, Taipei (TW); Chih-Hung Chuang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/460,252

(22) Filed: Mar. 16, 2017

(65) Prior Publication Data
US 2017/0267025 A1   Sep. 21, 2017

(30) Foreign Application Priority Data

Mar. 18, 2016 (TW) .............................. 105108443 A (51) Int. Cl.
*B60B 33/08* (2006.01)
*B60B 33/00* (2006.01)
*B60B 33/04* (2006.01)

(52) U.S. Cl.
CPC ...... *B60B 33/0044* (2013.01); *B60B 33/0028* (2013.01); *B60B 33/045* (2013.01); *B60B 2900/541* (2013.01); *B60B 2900/551* (2013.01)

(58) Field of Classification Search
CPC ..... Y10T 16/188; Y10T 16/218; B60B 33/08; B60B 33/001; B60B 33/0018; B60B 33/0002; B60B 33/0005; B60B 33/0044; B60B 33/0028; B60B 33/045; B60B 2900/541; B62B 2301/252; B62B 5/0083; A45C 5/14; A45C 5/143; A45C 5/142
See application file for complete search history.

(56) References Cited

U.S. PATENT DOCUMENTS 3,621,961 A * 11/1971 Stumpf .................. B65G 13/10
193/36
3,878,927 A * 4/1975 Murakami ............. B65G 13/10
193/37

(Continued)

FOREIGN PATENT DOCUMENTS

CN       1803478      7/2006
CN       203567468    4/2014

*Primary Examiner* — Chuck Mah
(74) *Attorney, Agent, or Firm* — JCIPRNET (57) ABSTRACT

A universal rotating module is provided. The universal rotating module comprises a main body including a first portion and two second portions; a main shaft passing through the through groove to pivotally connected to the main body; two bearings sleeved on and pivotally connected to the second portions along the second direction, respectively; two rollers pivotally connected to the second portions along a third direction, respectively; two hemispherical casings fixed to the two bearings, respectively. The first portion includes a through groove extending along a first direction, and the two second portions protrude from opposite sides of the first portion along a second direction, respectively. Each of the hemispherical casing includes a through hole at the top, and a portion of each of the rollers is exposed out of the corresponding through hole.

10 Claims, 8 Drawing Sheets

(56) References Cited

U.S. PATENT DOCUMENTS

| | | | | |
|---|---|---|---|---|
| 4,018,322 | A * | 4/1977 | Brown | B60B 33/08 |
| | | | | 193/35 MD |
| 4,203,177 | A * | 5/1980 | Kegg | B60B 33/08 |
| | | | | 16/24 |
| 5,412,838 | A * | 5/1995 | Yang | B60B 33/08 |
| | | | | 16/26 |
| 5,906,247 | A * | 5/1999 | Inoue | B60B 19/14 |
| | | | | 16/26 |
| 6,315,109 | B1 * | 11/2001 | Dean | B60P 1/02 |
| | | | | 193/35 MD |
| D516,767 | S * | 3/2006 | Layne | D34/29 |
| 8,496,299 | B2 * | 7/2013 | Brudniok | B60B 19/003 |
| | | | | 16/45 |
| 9,004,202 | B2 * | 4/2015 | Riwan | B60B 19/003 |
| | | | | 180/7.1 |
| 9,783,001 | B1 * | 10/2017 | Panter | B60B 33/08 |
| 2016/0193871 | A1 * | 7/2016 | McKinnon et al. | |

* cited by examiner

UNIVERSAL ROTATING MODULE

CROSS-REFERENCE TO RELATED APPLICATION

This application claims the priority benefit of TW application serial No. 105108443, filed on Mar. 18, 2016. The entirety of the above-mentioned patent application is hereby incorporated by references herein and made a part of specification.

BACKGROUND OF THE INVENTION

Field of the Invention

The disclosure relates to a rotating module and, more specifically to, a universal rotating module.

Description of the Related Art

Figure 1:
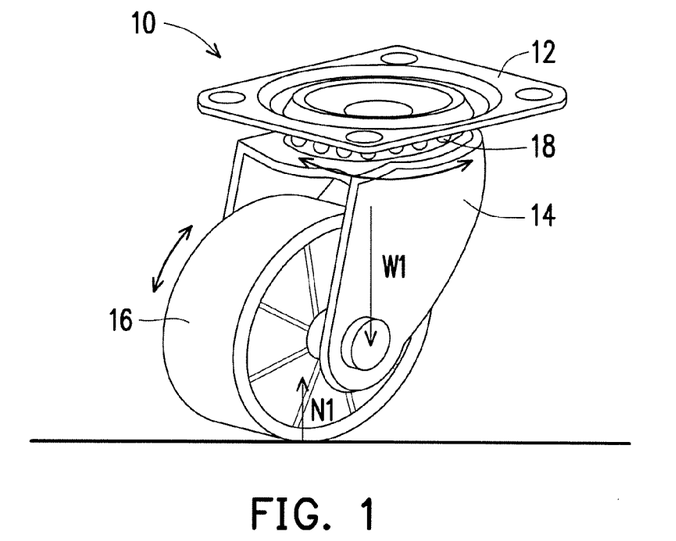
FIG. 1 is a schematic diagram showing a conventional rotating module.

FIG. 1 is a schematic diagram showing a conventional rotating module. Please refer to FIG. 1, a rotating module 10 includes a fixing base 12, a supporting frame 14, a rolling wheel 16 and a plurality of ball bearings 18. The rolling wheel 16 is pivotally connected to the supporting frame 14. The supporting frame 14 is pivotally connected to the fixing base 12. The ball bearings 18 are disposed between the supporting frame 14 and the fixing base 12 to facilitate smooth rotations of the supporting frame 14 and the fixing base 12. The fixing base 12 is fixed to an object (such as a chair and a desk, not shown) to allow the object to rotate or move via the rotating module 10.

However, an axis of the rolling wheel 16 and the axis of the fixing base 12 do not coincide in a same vertical line. Thus, the rotating module 10 has a rotation radius when changing the motion direction. Therefore, the conventional rotating module 10 may collide with some articles nearby and deviate from a predetermined path when changing its motion direction.

BRIEF SUMMARY OF THE INVENTION

According to an aspect of the disclosure, a universal rotating module is provided. The universal rotating module comprises: a main body including a first portion and two second portions, a main shaft passing through the through groove to pivotally connected to the main body, two bearings sleeved on and pivotally connected to the second portions along the second direction, respectively, two rollers pivotally connected to the second portions along a third direction, respectively, and two hemispherical casings fixed to the two bearings, respectively. The first portion includes a through groove extending along a first direction, and the two second portions protrude from opposite sides of the first portion along a second direction, respectively. The first direction, the second direction and the third direction are perpendicular to each other. Each of the hemispherical casing includes a through hole at the top of the corresponding hemispherical casing, and a portion of each of the rollers is exposed out of the corresponding through hole. The universal rotating module rotates around the main shaft extending along the first direction relative to the main shaft, the two hemispherical casings separate from each other and rotate around the second portions extending along the second direction relative to the second portions, respectively, and the two rollers rotate around an axis along the third direction relative to the second portions, to make the universal rotating module move in any direction.

In sum, in embodiments, the universal rotating module rotates around the main shaft extending along the first direction relative to the main shaft via the main body. The two hemispherical casings separate from each other and rotate around the second portions extending along the second direction relative to the second portions, respectively, and the two rollers rotate around the axis extending along the third direction relative to the second portions, respectively, and thus the universal rotating module is capable of moving in any direction. Since the gravity of universal rotating module and the normal force from the ground pass through the same point, the universal rotating module may not deviate from its predetermined path and turn over to be deformed when changing the motion direction. Furthermore, the universal rotating module is assembled or disassembled rapidly to facilitate cleaning or maintaining. Moreover, the universal rotating module moves with no noises and is capable of climbing the obstacles.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

FIG. 2 to FIG. 5 are schematic diagrams showing different views of a universal rotating module in an embodiment. Please refer to FIG. 2 to FIG. 5, in an embodiment, a universal rotating module 100 is capable of rotating towards any direction and does not deviate from a predetermined path when changing its motion direction. The universal rotating module 100 is capable of climbing obstacles. The universal rotating module 100 moves quietly, and does not turn over when it stops. The service life of the universal rotating module 100 is long. It is convenient to assemble, disassemble and clean the universal rotating module 100. Details are described hereinafter.

Figure 2:
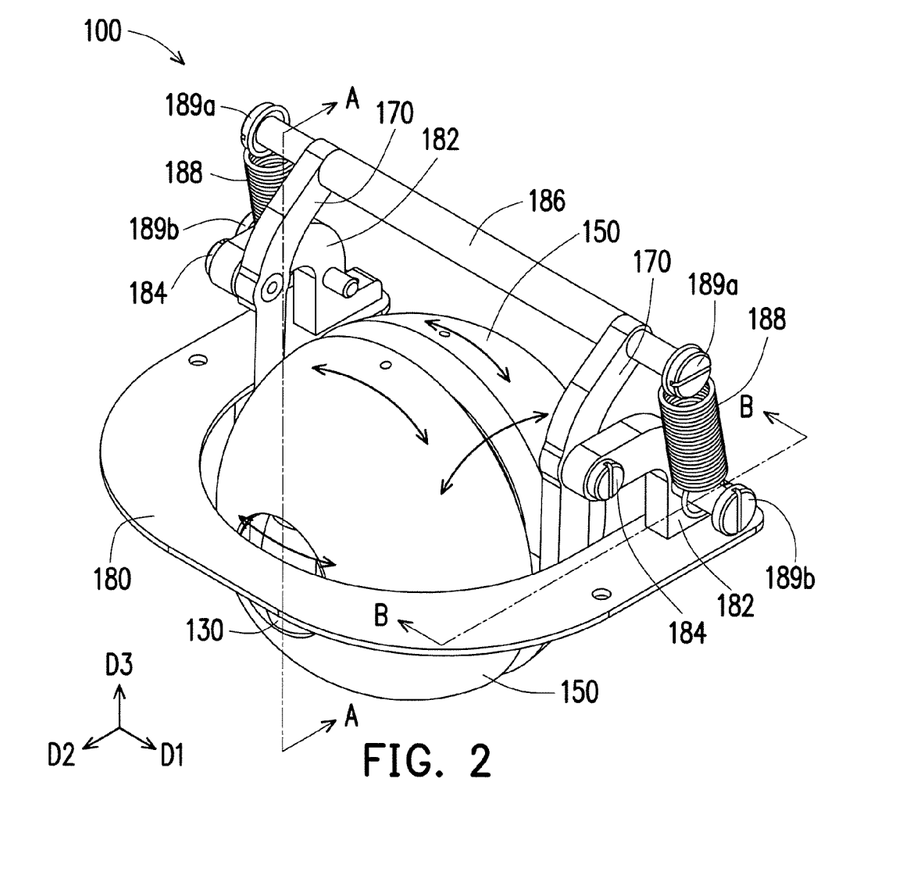
FIG. 2 to FIG. 5 are schematic diagrams showing different views of a universal rotating module in an embodiment.
Figure 3:
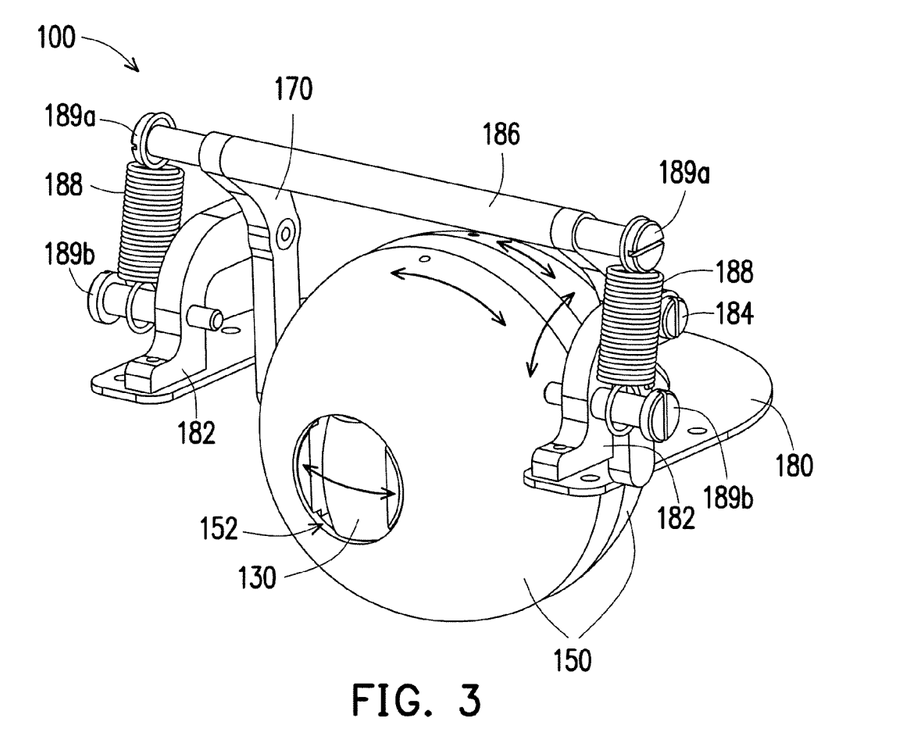
Figure 6:
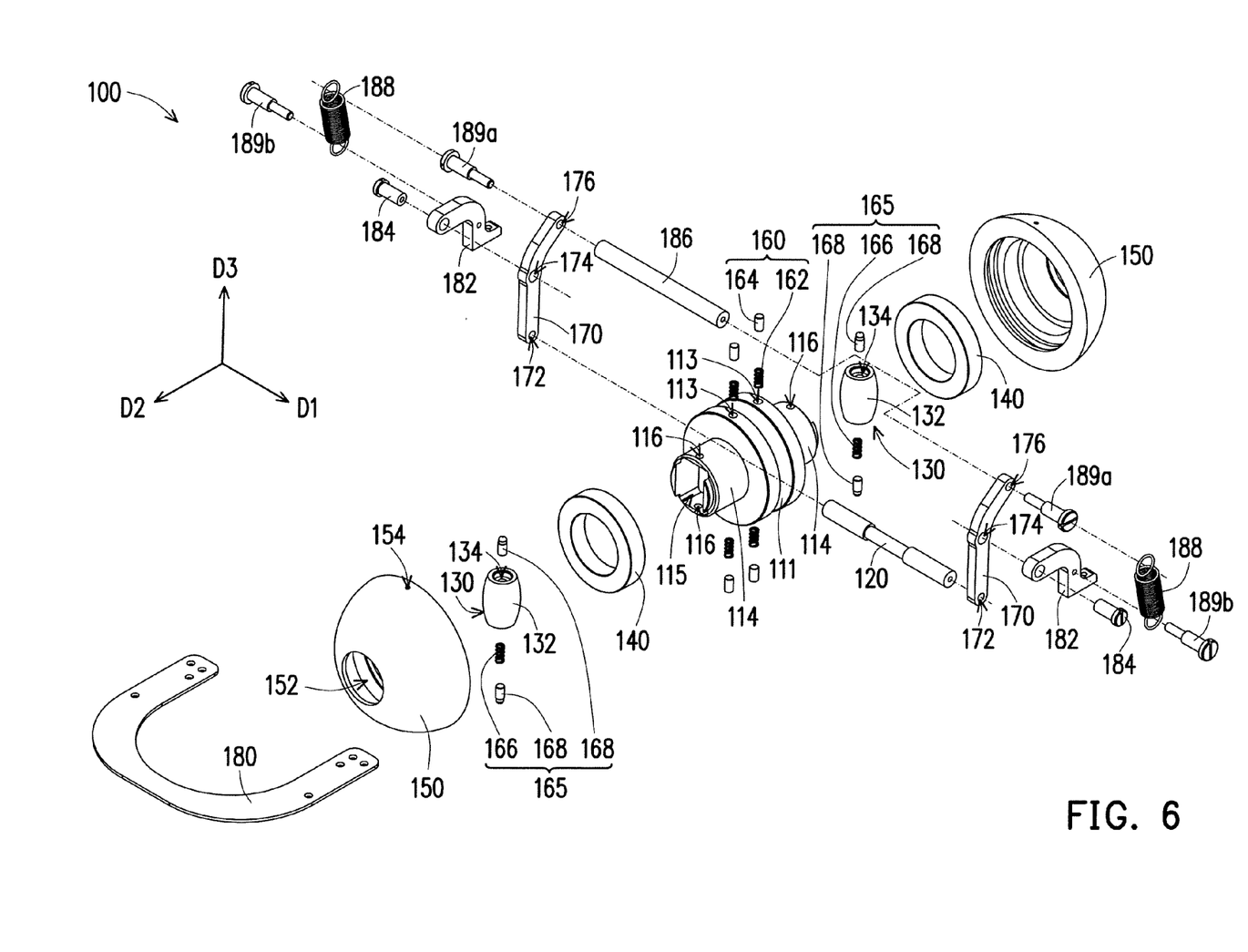
FIG. 6 is an exploded view of the universal rotating module in FIG. 2.
Figure 7:
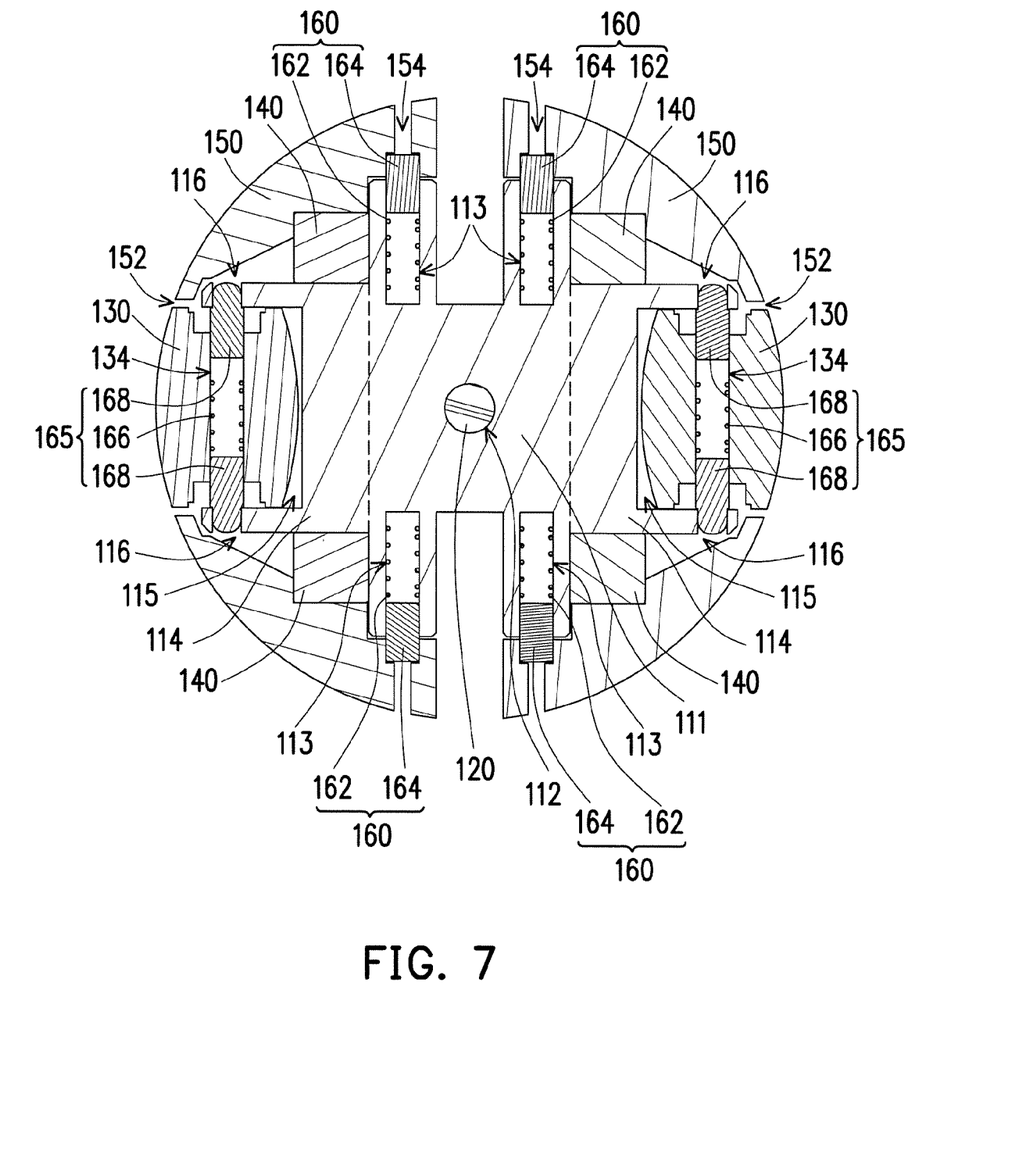
FIG. 7 is a section view of the universal rotating module along line A-A in FIG. 2.
Figure 8:
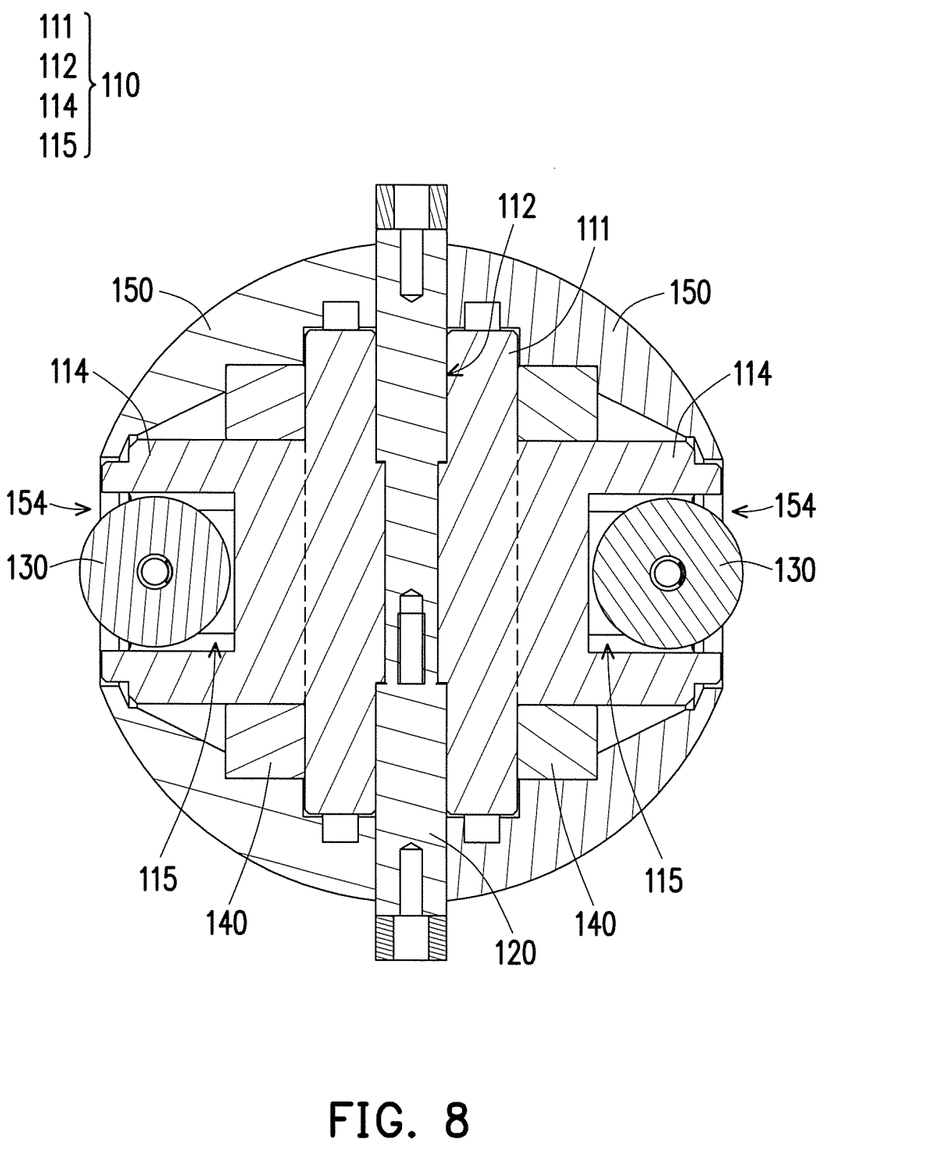
FIG. 8 is a section view of the universal rotating module along line B-B in FIG. 2.

FIG. 6 is an exploded view of the universal rotating module in FIG. 2. FIG. 7 is a section view of the universal rotating module along line A-A in FIG. 2. FIG. 8 is a section view of the universal rotating module along line B-B in FIG. 2.

Please refer to FIG. 6 to FIG. 8. In the embodiment, a universal rotating module 100 includes a main body 110, a main shaft 120, two rollers 130, two bearings 140 and two hemispherical casings 150. As shown in FIG. 7, the main body 110 includes a first portion 111 and two second portions 114. The first portion 111 is a central part of the main body 110, as shown in FIG. 8. The first portion 111 includes a through groove 112 extending along a first direction D2 (as indicated in FIG. 6). The two second portions 114 protrude from two opposite sides of the first portion 111 along a second direction D2 (as indicated in FIG. 6), respectively.

In the embodiment, the main body 110 is one piece. The first portion 111 and the second portions 114 are defined for clearly describing relative positions of other components. In an embodiment, the first portion 111 and the second portions 114 of the main body 110 are individual components that are assembled together. The main shaft 120 passes through the through groove 112 to be pivotally connected to the main body 110. That is, the main body 110 rotates around the main shaft 120 which extends along the first direction as an axis.

The two bearings 140 are sleeved on and pivotally connected to the two second portions 114 along a second direction D2, respectively. The two hemispherical casing 150 are fixed to the two bearings 140, respectively. That is, the two hemispherical casings 150 separate from one another and are capable of rotating around an axis of the second portions 114 extending along the second direction D2 relative to the two second portions 114, respectively.

Each of the hemispherical casing 150 includes a through hole 152 formed at the top of the hemispherical casing 150. A part of the roller 130 is exposed out of the corresponding through hole 152. In the embodiment, the two rollers 130 is pivotally connected to the second portions 114 along a third direction D3, respectively. The first direction D1, the second direction D2 and the third direction D3 are perpendicular to each other. That is, the roller 130 rotates around an axis along the third direction D3 relative to the main body 110.

Therefore, in the embodiment, the universal rotating module 100 rotates around the axis of the main shaft 120 extending along the first direction D1 via the main body 110 relative to the main shaft 120. The two hemispherical casings 150 separate from each other and rotate around the axis of the second portions 114 extending along the second direction D2 relative to the second portions 114, respectively. The two rollers 130 rotate around the axis along the third direction D3 relative to the two second portions 114 of the main body 110, respectively. Thus, the universal rotating module 100 is capable of moving along any direction.

In the embodiment, the cross section of the roller 130 along the third direction D3 is tapered from a central part 132 towards the sides of the roller 130 to be shaped like a wine bucket. With such a configuration, an outline of the roller 130 which is exposed out of the through hole 152 is formed on the same arc with that of adjacent portions of the hemispherical casing 150, as shown in FIG. 7. Thus, the universal rotating module 100 rotates smoothly when the touchpoint with the ground is changed from the hemispherical casing 150 to the roller 130, and vice versa.

As shown in FIG. 1, the gravity W1 of the total of the conventional rotating module 10 and the object supported thereon falls on the axis of the fixing base 12. The normal force N1 against the conventional rotating module 10 and the object thereon from the ground passes through the contact position between the rolling wheel 16 and the ground. Thus, the conventional rotating module 10 has a rotation radius when changing the motion direction and thus deviates easily. The annular rolling wheel 16 is easily deformed to be oval due to the arm of the gravity. When the object configured with the conventional rotating module 10 stops moving, the object turns over easily at the fulcrum where the rolling wheel 16 contacts with the ground due to the arm of the gravity W1.

Figure 4:
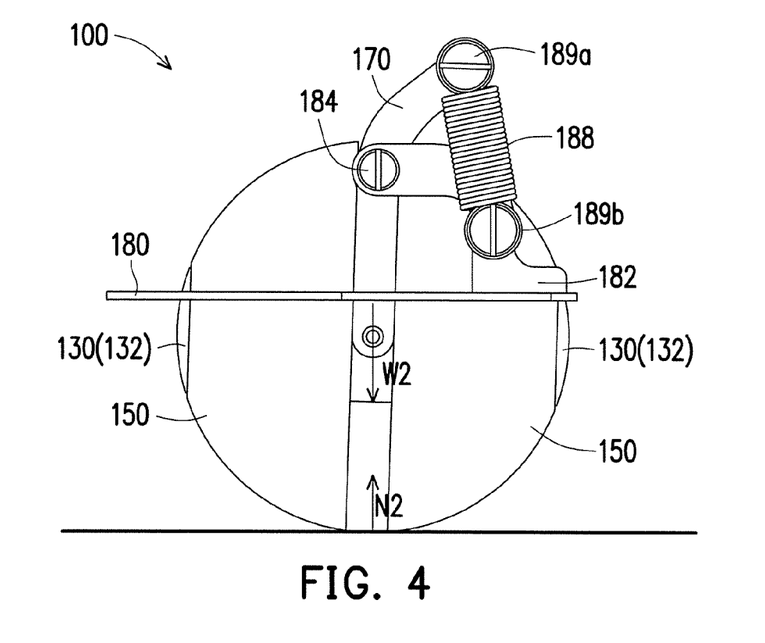
Figure 5:
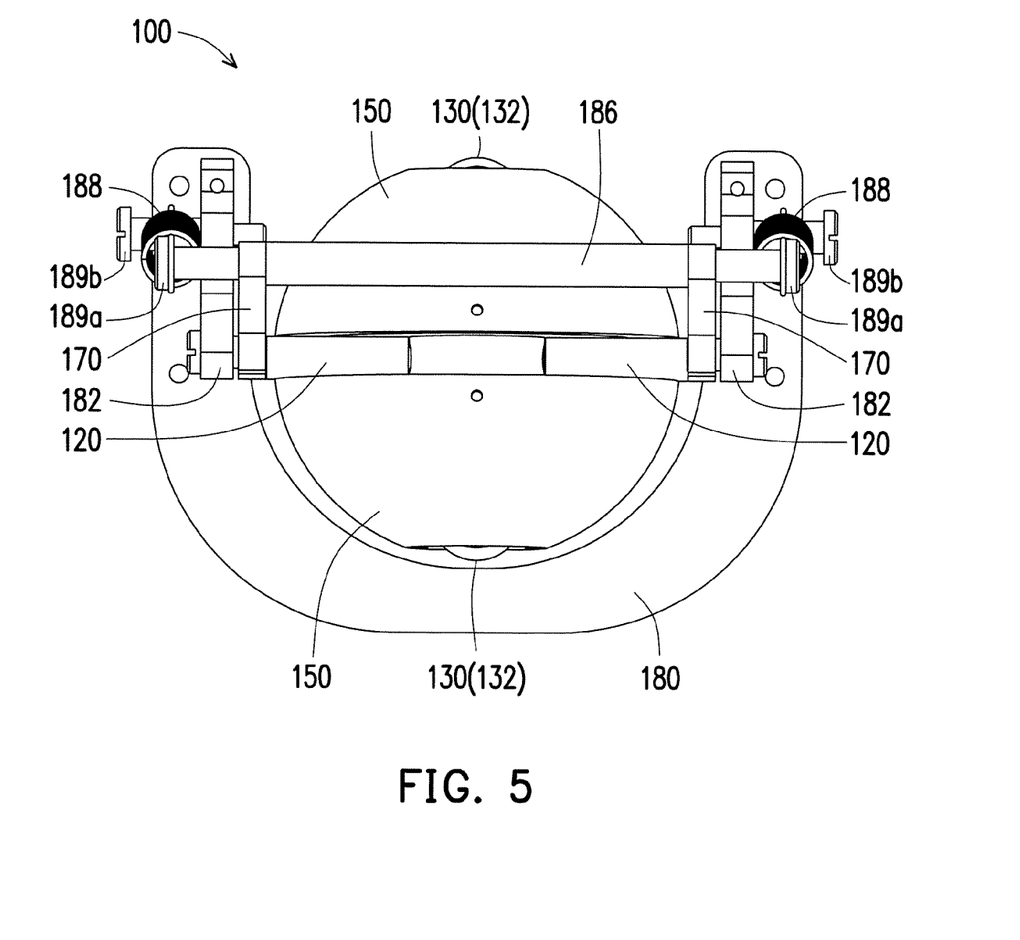

As shown in FIG. 4, in the embodiment, the average gravity W2 and the average normal force N2 of the universal rotating module 100 and the object (not shown) supported thereon pass through the same point (fulcrum). That is, the universal rotating module 100 has no rotation radius when changing the motion direction. As a result, the universal rotating module 100 changes its motion direction instantly. Therefore, the universal rotating module 100 would not deviate from the predetermined path to collide with the articles nearby when changing its motion direction. Additionally, since the average gravity W2 of the universal rotating module 100 and the object (not shown) supported on the universal rotating module 100 has no arm of the force, the universal rotating module 100 would not turn over due to the gravity W2 in a static state. Furthermore, in the embodiment, the main body 110 of the universal rotating module 100 is metal with good hardness and does not deform easily.

Generally, the rolling wheel 16 of the conventional rotating module 10 is made of the rigid tire, which makes noises when in contact with the ground. The rolling wheel 16 has no bearings thereon, which also makes noises after a long time use. In the embodiment, the hemispherical casings 150 and the roller 130 of the universal rotating module 100 are made of soft plastic materials, which may fit smoothly with the ground to reduce the noises generated due to the friction with the ground. The bearings 140 are configured between the hemispherical casings 150 and the second portions 114 of the main body 110 to increase smoothness of the rotations, and thus the noises is reduced. In an embodiment, the materials of the main body 110, the hemispherical casings 150 and the roller 130 of the universal rotating module 100 are various with the consideration that the material hardness of the hemispherical casings 150 is lower than that of the main body 110.

In the embodiment, to facilitate the assembly of the universal rotating module 100, the universal rotating module 100 further includes at least two first quick release components 160. Each of the first quick release components 160 includes a first elastic member 162 and a first quick release pin 164. Each of the hemispherical casings 150 includes at least one first quick release hole 154. The first portion 111 of the main body 110 includes at least two recesses 113 extending along the third direction D3 and corresponding to the at least two first quick release holes 154. Each of the first elastic members 162 is configured in the corresponding recess 113. Each of the first quick release pin 164 is disposed adjacent to the corresponding first elastic member 162 and passes through the corresponding first quick release hole 154.

In the embodiment, the hemispherical casing 150 includes two first quick release holes 154 at two opposite sides. The first portion 111 of the main body 110 includes four recesses 113 extending along the third direction D3. The four recesses 113 are disposed in pairs. Each pair of the recesses 113 are foil led symmetrically at the opposite upside and downside of the first portion 111. The positions of the four recesses 113 correspond to the four first quick release holes 154 of the hemispherical casings 150, respectively. The universal rotating module 100 includes four first quick release components 160 which are configured in pairs. Each pair of the quick release component 160 corresponds to the recesses 113 at the upside and downside of the first portion 111, respectively. The first elastic member 162 is configured at the corresponding recess 113. The first quick release pin 164 is disposed adjacent to the corresponding first elastic member 162 and passes through the corresponding first quick release hole 154 of the hemispherical casing 150.

Therefore, in assembling the hemispherical casings 150 to the main body 110, the two first elastic members 162 are placed into the two recesses 113, the two first quick release pins 164 are placed on the two first elastic members 162 and then pressed, and the main body 110 is covered by the hemispherical casings 150. Then, the force against the two first quick release pins 164 is released, the two first elastic members 162 restores to push the two first quick release pins 164 into the two first quick release holes 154 of the hemispherical casing 150, respectively. In an embodiment, in disassembling the hemispherical casing 150 from the main body 110, the two opposite first quick release pins 164 are pushed inwardly until the two first quick release pins 164 move out of the two first quick release holes 154 of the hemispherical casing 150. Then, the hemispherical casing 150 is detached from the main body 110.

In an embodiment, the universal rotating module 100 further includes two second quick release components 165. Each of the second quick release components 165 includes a second elastic member 166 and at least one second quick release pin 168. Each of the rollers 130 includes a groove 134 extending along the third direction D3. The second elastic member 166 is configured in the groove 134. Each of the second portion 114 includes at least one second quick release hole 116 interconnected to the groove 134. The second quick release pins 168 are disposed adjacent to the second elastic members 166, respectively. The second quick release pin 168 passes through the corresponding second quick release hole 116.

In the embodiment, the second portion 114 includes a recessed area 115 which is interconnected to the two second quick release holes 116. The roller 130 is disposed in the corresponding recessed area 115. The second quick release component 165 includes the second elastic member 166 and two second quick release pins 168. The groove 134 passes through the roller 130. The second elastic member 166 is disposed in the groove 134. The second quick release pins 168 are disposed at the two sides of the second elastic member 166 and pass through the second quick release holes 116, respectively.

In an embodiment, in assembling the roller 130 to the main body 110, the second elastic members 166 are placed into the grooves 134, respectively. The second quick release pins 168 are placed at the two ends of the second elastic member 166. After the second quick release pins 168 are pressed, the rollers 130 are placed into the recessed areas 115 of the second portions 114, respectively. Then, the force against the second quick release pins 168 is released. The second elastic members 166 restore to push the second quick release pins 168 into the second quick release holes 116, respectively. In an embodiment, in disassembling the roller 130 from the main body 110, the two opposite second quick release pins 168 are pushed inwardly until the second quick release pins 168 moves out of the second quick release holes 116 of the second portion 114. The roller 130 is then detached from the main body 110.

In assembling the conventional rotating module 10, a special tool is needed to rivet the components. Moreover, a plurality of the ball bearings 18 needs to be mounted manually. Therefore, the rotating module cannot be assembled rapidly, and the rolling wheel 16 cannot be disassembled for cleaning. In the embodiment, the universal rotating module 100 is assembled or disassembled rapidly to facilitate the cleaning and maintenance via the quick release components.

In an embodiment, the first quick release component 160 and the second quick release component 165 are the same or substituted for one another. In an embodiment, the numbers and positions of the first and second elastic members 162, 166 and the first and second quick release pins 164, 168 are various, which is not limited herein. In an embodiment, the two opposite recesses 113 of the first portion 111 of the main body 110 are interconnected. In an embodiment, the roller 130 has two grooves 134 which are not interconnected centrally.

In the embodiment, the universal rotating module 100 further includes two connecting rods 170, a suspension base 180, two rod-fixed seats 182 and two rotating shafts 184. The connecting rods 170 are configured at two sides of the main body 110. Each of the connecting rod 170 includes a first fixing portion 172 and a second fixing portion 174. The two first fixing portions 172 are fixed to two ends of the main shaft 120, respectively. The rod-fixed seats 182 are configured at two sides of the suspension base 180, respectively, and locked to the suspension base 180. The rotating shafts 184 are pivotally connected to the rod-fixed seat 182, respectively by passing through the rod-fixed seats 182. The rotating shaft 184 is fixed to the second fixing portion 174. That is, the first fixing portion 172 of the connecting rod 170 is pivotally connected to the main body 110 via the main shaft 120. The second fixing portion 174 of the connecting rod 170 is pivotally connected to the rod-fixed seat 182 to rotate relative to the suspension base 180. Therefore, the main body 110 is capable of rotating relative to the suspension base 180. The suspension base 180 substantially keeps in an original state (such as in a horizontal level).

Figure 9:
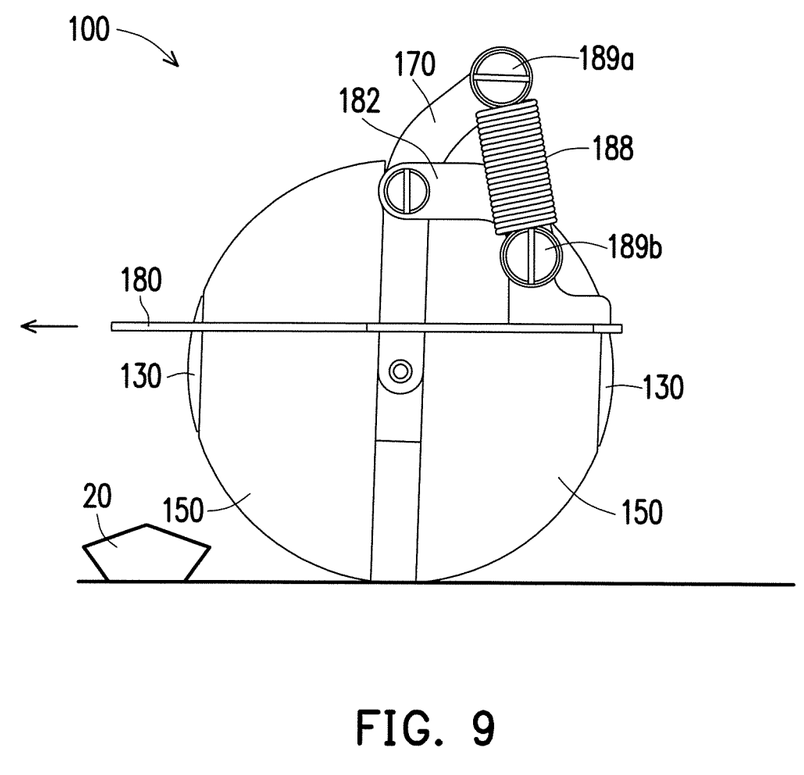
FIG. 9 to FIG. 10 are schematic diagrams showing the universal rotating module in FIG. 2 when crossing an obstacle.
Figure 10:
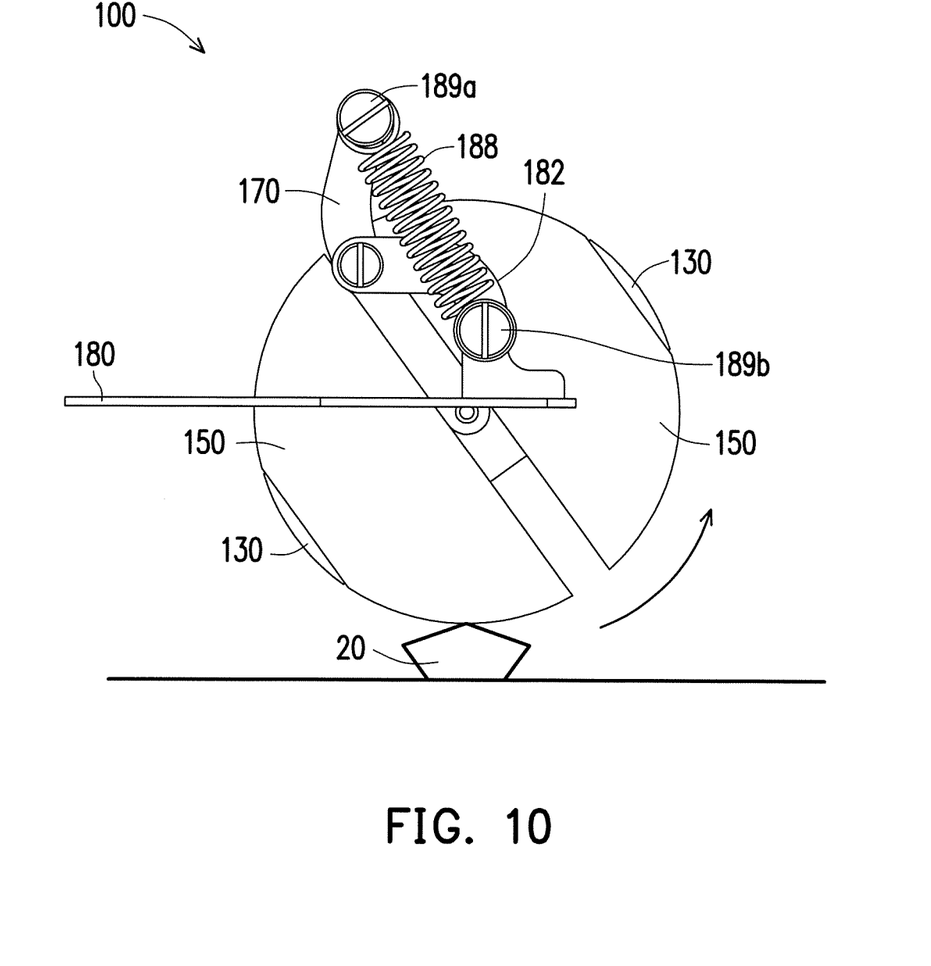

FIG. 9 to FIG. 10 are schematic diagrams showing the universal rotating module in FIG. 2 when crossing an obstacle. Please refer to FIG. 9 and FIG. 10, when a part of the hemispherical casings 150 or the rollers 130 hit an obstacle 20, the hemispherical casing 150 or the roller 130 of the universal rotating module 100 climbs up or down along the obstacle 20. The connecting rod 170 rotates around the first fixing portion 172 relative to the suspension base 180. The suspension base 180 keeps in the original state when the universal rotating module 100 climbs the obstacle. Therefore, if the object is configured on the suspension base 180, the object keeps in the horizontal level even when the universal rotating module 100 climbs the obstacle 20.

In an embodiment, the universal rotating module 100 further includes a balance lever 186. Each of the connecting rod 170 further includes a third fixing portion 176. The second fixing portion 174 is configured between the first fixing portion 172 and the third fixing portion 176. The two third fixing portions 176 are fixed to two ends of the balance lever 186, respectively. In the embodiment, the third fixing portion 176 is fixed to the balance lever 186 via a fixing element 189*a*. The balance lever 186 allows the two connecting rods 170 to rotate synchronously to avoid the motion direction of the universal rotating module 100 deviates due to different rotation angles of the connecting rods 170.

In an embodiment, the universal rotating module 100 further includes two third elastic members 188. An end of the third elastic member 188 is fixed to the third fixing portion 176, respectively. Another end of the third elastic member 188 is fixed to the corresponding rod-fixed seat 182, respectively. In the embodiment, the fixing element 189*a* passes through one end of the third elastic member 188 and is fixed to the third fixing portion 176 of the connecting rod 170. Another fixing element 189*b* passes through the third elastic member 188 and is fixed to the rod-fixed seat 182. In an embodiment, the fixing elements 189*a*, 189*b* are screws. In other embodiments, the type of the fixing elements 189*a*, 189*b* is various, which is not limited herein. The third elastic member 188 is configured to allow the connecting rod 170 to return back automatically to the position shown in FIG. 9 after the universal rotating module 100 climbs the obstacle 20. In an embodiment, the connecting rod 170 is pulled back manually or by other means. In the embodiment, the way of making the connecting rod 170 return back automatically is various, which is not limited herein.

In the embodiment, when the universal rotating module 100 hits the obstacle 20, the hemispherical casings 150 are pushed by a reaction force. Then, the connecting rod 170 rotates around the rotating shaft 184. After the universal rotating module 100 climbs the obstacle 20, the third fixing portion 176 of the connecting rod 170 is pulled back by the third elastic member 188.

In sum, in the embodiments of the universal rotating module, the main body can rotate around the main shaft extending along the first direction relative to the main shaft via. The two hemispherical casings separate from each other. The two hemispherical casings rotate around the second portions extending along the second direction relative to the second portions, respectively. Two rollers rotate around the axis extending along the third direction relative to the second portions, respectively. Thus, the universal rotating module is capable of moving in any direction. The gravity of universal rotating module and the normal force from the ground pass through the same point. As a result, the universal rotating module would not deviate from its predetermined path, turn over, or be deformed when changing the motion direction. Furthermore, the universal rotating module is easily assembled or disassembled rapidly to facilitate the cleaning and maintenance. Moreover, the universal rotating module moves with lower noises and is capable of climbing obstacles.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A universal rotating module, comprising:
   a main body, including a first portion and two second portions, wherein the first portion includes a through groove extending along a first direction, and the two second portions protrude from opposite sides of the first portion along a second direction, respectively;
   a main shaft, passing through the through groove to pivotally connected to the main body;
   two bearings, sleeved on and pivotally connected to the second portions along the second direction, respectively;
   two rollers, pivotally connected to the second portions along a third direction, respectively, wherein the first direction, the second direction and the third direction are perpendicular to each other; and
   two hemispherical casings, fixed to the two bearings, respectively, wherein each of the hemispherical casing includes a through hole at the top of the corresponding hemispherical casing, and a portion of each of the rollers is exposed out of the corresponding through hole,
   wherein the universal rotating module rotates around the main shaft extending along the first direction relative to the main shaft, the two hemispherical casings separate from each other and rotate around the second portions extending along the second direction relative to the second portions, respectively, and the two rollers rotate around an axis along the third direction relative to the second portions, to make the universal rotating module move in any direction.

2. The universal rotating module according to claim 1, further comprising:
   two first quick release components, wherein each of the first quick release components includes a first elastic member and a first quick release pin, each of the hemispherical casings includes a first quick release hole, the first portion of the main body includes two recesses extending along the third direction and corresponding to the two first quick release holes, each of the first elastic members is configured in the corresponding recess, each of the first quick release pins is disposed adjacent to the corresponding first elastic member and passes through the corresponding first quick release hole.

3. The universal rotating module according to claim 2, further comprising:
   two second quick release components, each of the two second quick release components includes a second elastic member and a second quick release pin, each of the rollers includes a groove extending along the third direction, the second elastic member is configured in the groove, each of the second portions includes a second quick release hole interconnected to the groove, each of the second quick release pin is disposed adjacent to the second elastic member and passes through the corresponding second quick release hole.

4. The universal rotating module according to claim 3, wherein each of the second portions includes a recessed area interconnected to the second quick release hole, and the two rollers are configured at the recessed areas, respectively.

5. The universal rotating module according to claim 1, further comprising:
   two connecting rods, disposed at two sides of the main body, each of the two connecting rods includes a first fixing portion, the two first fixing portions are fixed to two ends of the main shaft, respectively.

6. The universal rotating module according to claim 5, further comprising:
   a suspension base, two rod-fixed seats and two rotating shafts, wherein the rod-fixed seats are configured at two sides of the suspension base, each of the connecting rods further includes a second fixing portion, the two rotating shafts are pivotally connected to the two the rod-fixed seats and fixed to the two second fixing portions, respectively.

7. The universal rotating module according to claim 6, further comprising:
   a balance lever, wherein each of the connecting rod further includes a third fixing portion, the second fixing portion is configured between the first fixing portion and the third fixing portion, the two third fixing portions are fixed to two ends of the balance lever, respectively.

8. The universal rotating module according to claim 7, further comprising:
   two elastic members, wherein an end of each of the elastic members is fixed to the corresponding third fixing portion, and the other end of the elastic member is fixed to the corresponding rod-fixed seat.

9. The universal rotating module according to claim 1, wherein a cross section of the roller along the third direction is tapered from a central part towards two sides to be shaped like a wine bucket, and an outline of the roller exposed out of the through hole is formed on the same arc with that of adjacent portions of the hemispherical casing.

10. The universal rotating module according to claim 1, wherein a material hardness of the hemispherical casing is lower than the material hardness of the main body.

\* \* \* \* \*